3,700,657
TETRAHYDROPYRAZOLODIAZEPINONE COMPOUNDS AND METHODS FOR THEIR PRODUCTION
Ivan C. Nordin, Ann Arbor, Mich., assignor to Parke, Davis & Company, Detroit, Mich.
No Drawing. Filed May 18, 1971, Ser. No. 144,628
Int. Cl. C07d 53/02
U.S. Cl. 260—239.3 B                    6 Claims

ABSTRACT OF THE DISCLOSURE

3 - methyl - 4,6,7,8 - tetrahydropyrazolo[4,3-e][1,4]-diazepin-5(1H)-one, substituted in the 1-position by lower alkyl and optionally in the 4- and 7-positions by methyl; salts thereof; and their production by catalytically hydrogenating a dihydropyrazolodiazepinone, or by reacting one of the 7-unsubstituted tetrahydropyrazolodiazepinones with a methylating agent. The compounds of the invention are useful as anticonvulsant agents.

SUMMARY AND DETAILED DESCRIPTION

The present invention relates to new heterocyclic nitrogen compounds that are useful as pharmacological agents and to methods for their production. More particularly, the invention relates to new tetrahydropyrazolodiazepinone compounds having the formula

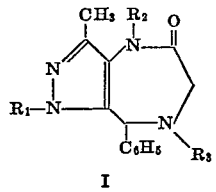

I and to pharmaceutically-acceptable acid-addition salts thereof; where $R_1$ is an alkyl group having not more than three carbon atoms, and each of $R_2$ and $R_3$ is hydrogen or methyl.

In accordance with the invention, tetrahydropyrazolodiazepinone compounds having the formula

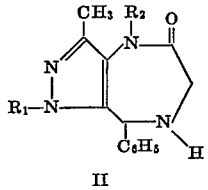

II and salts thereof, are produced by reacting a dihydropyrazolodiazepinone compound having the formula

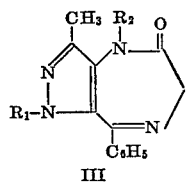

III or a salt thereof, with gaseous hydrogen in the presence of a hydrogenation catalyst; where each of $R_1$ and $R_2$ has the same meaning as previously given. Hydrogenation catalysts that may be used include Raney nickel, Raney cobalt, and noble metal catalysts, such as platinum, platinum oxide, palladium, and palladium oxide, which may optionally be supported on an inert carrier, such as charcoal. The preferred hydrogenation catalyst is platinum-on-charcoal. The reaction is best carried out in an unreactive solvent medium. Suitable solvents include lower alkanols, such as methanol, ethanol, and 2-propanol; lower alaknoic acids, such as acetic acid; cyclic ethers, such as dioxane and tetrahydrofuran; and tertiary amides, such as N,N-dimethylformamide and N,N-dimethylacetamide; as well as mixtures of these. A preferred solvent for use with the preferred platinum-on-charcoal catalyst is methanol. The temperature of the reaction is not critical and the reaction may conveniently be carried out at room temperature. The duration of the reaction will vary, depending somewhat upon the temperature, the hydrogen pressure, and the amount of dihydropyrazolodiazepinone starting material, and is best determined by monitoring the adsorption of hydrogen during the course of the reaction. The reaction is complete when one molecular equivalent of hydrogen has been taken up. The hydrogenation is best accomplished by employing hydrogen at an initial pressure in the range of 15–100 lbs./in.$^2$. The product of the reaction may be obtained in either free base or acid-addition salt form, depending upon the form of the dihydropyrazolodiazepinone starting material used, or by appropriate adjustment of the pH of the reaction mixture.

The dihydropyrazolodiazepinone starting materials of Formula III above are prepared as disclosed in U.S. Patent 3,557,095 or as described in detail hereinafter.

Also in accordance with the invention, 7-methyltetrahydropyrazolodiazepinone compounds having the formula

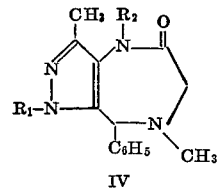

IV and salts thereof, are produced by reacting a tetrahydropyrazolodiazepinone compound having Formula II above with a methylating agent, where each of $R_1$ and $R_2$ has the aforementioned significance. Methylating agents that may be used include a methyl halide, dimethyl sulfate, a methyl hydrocarbonsulfonate, for example, methyl-p-toluene-sulfonate, and a mixture of formaldehyde and formic acid. When a methyl halide, a methyl hydrocarbonsulfonate, or dimethyl sulfate is used as a methylating agent, the reaction is preferably carried out in the presence of a base, such as potassium carbonate or sodium carbonate. The preferred methylating agent is a mixture of formaldehyde and formic acid. When the preferred formaldehyde-formic acid methylating agent is used, additional solvent is not required except to bring about complete solution of the starting material, in which case a small amount of a lower alkanol, such as ethanol, may be added to the reaction mixture. The temperature and duration of the reaction are not critical and may be varied over a wide range. With the preferred formaldehyde-formic acid methylating agent, a preferred temperature is one between 70 and 125° C., and at such temperature the reaction is essentially complete after a period of from one to 4 hours. Equimolar quantities of reactants may be employed. To insure complete reaction, however, it is preferable to use a slight excess of methylating agent. The product of the reaction may be isolated in either free base or salt form by appropriate adjustment of the pH of the reaction mixture.

The compounds of the invention can exist in the free base form having Formula I above, or in the form of an acid-addition salt. Pharmaceutically-acceptable acid-addition salts are formed as indicated above or by reaction of the free base tetrahydropyrazolodiazepinone compounds with any of a number of inorganic acids including hydrochloric, hydrobromic, hydriodic, nitric, sulfuric, and phosphoric, as well as with certain strong organic acids, such as methanesulfonic, benzenesulfonic, and p-toluenesulfonic. The free base tetrahydropyrazolodiazepinone compounds and their acid-addition salts may differ somewhat in certain physical properties, such as solubility in polar solvents, but they are otherwise equivalent for purposes of the invention.

The compounds of the invention are new chemical compounds that are useful as pharmacological agents. As such, they exert a depressant effect upon the central nervous system that is shown by their ability to prevent the occurrence of convulsions in laboratory animals following the administration of pentamethylenetetrazole.

The anticonvulsant activity of the compounds of the invention is measured in a standard test that is carried out essentially as described by Chen et al., A.M.A. Archives of Neurology and Psychiatry, vol. 66, pages 329–337 (1951), and vol. 68, pages 498–505 (1952), and by Chen et al., Journal of Pharmacology and Experimental Therapeutics, vol. 103, pages 54–61 (1951). In this test, each of a group of 5 rats is given a measured oral dose of a test compound, dissolved in water or suspended with acacia, followed 30 minutes later by a subcutaneous dose of 93 mg./kg. of pentamethylenetetrazole. This quantity of pentamethylenetetrazole quickly produces convulsions in 98–100% of untreated control rats. The treated animals are then observed visually for 30 minutes following administration of pentamethylenetetrazole, and anticonvulsant activity is judged by noting the time of onset and severity of clonic convulsive seizures and the number of animals completely protected from convulsions. The activity of a test compound at each dosage level is rated as follows: 4+, protection of all 5 rats; 3+, protection of 3 or 4 rats; 2+, protection of one or 2 rats; 1+, delay in onset; 0, no effect.

The results obtained in this test for some representative compounds of the invention are shown in the following table.

ANTICONVULSANT ACTIVITY

| Compound | Dose, mg./kg. | Rating |
|---|---|---|
| 1-ethyl-4,6,7,8-tetrahydro-3-methyl-8-phenyl-pyrazolo[4,3-e][1,4]diazepin-5(1H)-one. | 250 | 4+ |
|  | 125 | 4+ |
|  | 63 | 4+ |
|  | 32 | 4+ |
|  | 16 | 4+ |
|  | 8 | 1+ |
|  | 4 | 0 |
| 4,6,7,8-tetrahydro-1,3-dimethyl-8-phenylpyrazolo[4,3-e][1,4]diazepin-5(1H)-one. | 250 | 4+ |
|  | 125 | 4+ |
|  | 63 | 4+ |
|  | 32 | 3+ |
|  | 16 | 0 |
| 4,6,7,8-tetrahydro-3-methyl-8-phenyl-1-propyl-pyrazolo[4,3-e][1,4]-diazepin-5(1H)-one. | 250 | 4+ |
|  | 125 | 4+ |
|  | 63 | 4+ |
|  | 32 | 4+ |
|  | 16 | 3+ |
|  | 8 | 0 |
| 4,6,7,8-tetrahydro-3,4-dimethyl-8-phenyl-1-propylpyrazolo[4,3-e][1,4]-diazepin-5(1H)-one.[1] | 250 | 4+ |
|  | 125 | 4+ |
|  | 63 | 4+ |
|  | 32 | 4+ |
|  | 16 | 3+ |
|  | 8 | 0 |
| 4,6,7,8-tetrahydro-3,7-dimethyl-8-phenyl-1-propylpryazolo[4,3-e][1,4]-diazepin-5(1H)-one. | 250 | 4+ |
|  | 125 | 4+ |
|  | 63 | 4+ |
|  | 32 | 4+ |
|  | 16 | 2+ |
|  | 8 | 0 |

[1] Administered as the monohydrochloride salt.

The compounds of the invention are preferably administered orally, as indicated above, although parenteral administration can also be used. They can be combined with either a solid or liquid carrier or diluent and made available in varying amounts in such pharmaceutical forms as tablets, capsules, powders, and aqueous and non-aqueous suspensions and solutions.

The invention is illustrated by the following examples.

Example 1

A mixture consisting of 13.4 g. of 1-ethyl-4,6-dihydro-3 - methyl - 8 - phenylpyrazolo[4,3 - e][1,4]diazepin-5(1H)-one, 1.0 g. of 5% platinum-on-charcoal, and 100 ml. of methanol is shaken at room temperature with hydrogen at an initial pressure of 50 lbs./in.$^2$ until one molecular equivalent of hydrogen is taken up. The catalyst is then removed by filtration and the filtrate is evaporated under reduced pressure to give a solid residue of 1 - ethyl - 4,6,7,8 - tetrahydro - 3 - methyl - 8 - phenyl-pyrazolo[4,3-e][1,4]diazepin - 5(1H) - one; M.P. 185.5–187° C., following two crystallizations from ethanol.

The sulfate salt is prepared as follows. The above product (1.3 g.) is dissolved in 40 ml. of 0.5 N sulfuric acid, and the solution is lyophilized. The solid obtained is dissolved in a small amount of a warm mixture of methanol and ethyl acetate and the solution is treated with enough ether to effect the precipitation of solid 1 - ethyl - 4,6,7,8-tetrahydro - 3 - methyl - 8 - phenylpyrazolo[4,3-e][1,4] diazepin-5(1H)-one sulfate.

Example 2

Utilizing the procedure described in Example 1 above, from the hydrogenation of 50.7 g. of 4,6-dihydro-1,3-dimethyl - 8 - phenylpyrazolo[4,3 - e][1,4]diazepin-5(1H)-one in the presence of 3.0 g. of 5% platinum-on-charcoal in 400 ml. of methanol, there is obtained 4,6,7,8-tetrahydro - 1,3 - dimethyl - 8 - phenylpyrazolo[4,3-e] [1,4]diazepin-5(1H)-one; M.P. 186–188° C.

Example 3

Utilizing the procedure described in Example 1 above, from the hydrogenation of 31.1 g. of 4,6-dihydro-1,3,4-trimethyl - 8 - phenylpyrazolo[4,3 - e][1,4]diazepin-5(1H)-one, monohydrochloride in the presence of 1.0 g. of 5% platinum-on-charcoal in 300 ml. of methanol, there is obtained 4,6,7,8 - tetrahydro - 1,3,4 - trimethyl-8 - phenylpyrazolo[4,3-e][1,4]diazepin - 5(1H) - one, monohydrochloride; M.P. 248–250° C., with decomposition, following two crystallizations from ethanol-ether. The free base is obtained by dissolving the monohydrochloride salt product in water, treating the resulting solution with sufficient dilute aqueous sodium hydroxide to render it alkaline, extracting the alkaline mixture with ether, and drying and evaporating the ether extract under reduced pressure.

Example 4

Utilizing the procedure described in Example 1 above, from the hydrogenation of 28.3 g. of 4,6-dihydro-3-methyl - 8 - phenyl - 1 - propylpyrazolo[4,3-e][1,4]diazepin-5(1H)-one in the presence of 2.0 g. of 10% platinum-on-charcoal in 250 ml. of methanol, there is obtained 4,6,7,8 - tetrahydro - 3 - methyl - 8 - phenyl - 1 - propyl-pyrazolo[4,3-e][1,4]diazepin-5(1H)-one; M.P. 176.5–178° C., following crystallization from ethanol-pentane.

The 4,6 - dihydro - 3 - methyl - 8 - phenyl - 1 - propyl-pyrazolo[4,3-e][1,4]diazepin - 5(1H) - one starting material is prepared as described in the following.

A mixture consisting of 77.1 g. of 3-methylpyrazole-5-carboxylic acid, ethyl ester (for the preparation of this compound see J. Chem. Soc., 1945, 114) and 170 g. of 1-iodopropane is heated at 95–100° C. for 72 hours and is then evaporated under reduced pressure. The residue is dissolved in chloroform and the chloroform solution is poured into 400 ml. of saturated aqueous sodium bicarbonate with vigorous stirring. The organic phase is separated, washed with dilute aqueous sodium bicarbonate, dried, and evaporated to dryness to give a residue of 3-methyl-1-propylpyrazole-5-carboxylic acid, ethyl ester, which is purified by distillation; B.P. 103.5° C./8 mm. Hg.

A mixture consisting of 36 g. of 3-methyl-1-propyl-pyrazole-5-carboxylic acid, ethyl ester, 8 g. of sodium hydroxide, and 70 ml. of water is heated at 95–100° C.

for one hour and 45 minutes, and the resulting solution is cooled and acidified with concentrated hydrochloric acid. The acidic mixture is then cooled to 5° C., and the solid 3-methyl-1-propylpyrazole-5-carboxylic acid that crystallizes is isolated, washed with water, and dried; M.P. 110–111.5° C., following recrystallization from ethanol-water.

To a stirred mixture of 32 ml. of 90% nitric acid and 98.5 g. of fuming sulfuric acid is added in portions 53.5 g. of 3-methyl-1-propylpyrazole-5-carboxylic acid at such a rate so as to maintain the temperature of the reaction mixture at about 70° C. After addition is complete, the resulting mixture is heated at 95–100° C. for one hour, cooled, and poured into ice-water. The solid 3 - methyl - 4 - nitro - 1 - propylpyrazole - 5 - carboxylic acid that precipitates is isolated, washed with cold water, and dried; M.P. 129.5–132° C., following crystallization from acetonitrile.

A mixture of 174.5 g. of 3-methyl-4-nitro-1-propyl-pyrazole-5-carboxylic acid and 171 g. phosphorus pentachloride is heated at 95–100° C. for one hour and is then distilled under reduced pressure. Following a forerun that is largely phosphorus oxychloride, the desired product, 3 - methyl - 4 - nitro - 1 - propylpyrazole - 5 - carbonyl chloride, is collected at 148–150° C./13 mm. Hg.

A solution of 170.5 g. of 3-methyl-4-nitro-1-propyl-pyrazole-5-carbonyl chloride in 350 ml. of benzene is added to a suspension of 100.2 g. of powdered anhydrous aluminum chloride in 550 ml. of benzene. The reaction mixture is stirred and heated under reflux for 16 hours, cooled, and poured with stirring into ice-water. The organic phase is separated, washed with water and with dilute aqueous sodium hydroxide, dried, and evaporated under reduced pressure to give a residue of 5-benzoyl-3-methyl-4-nitro-1-propylpyrazole, which is purified by distillation; B.P. 133–140° C./0.12 mm. Hg.

To a stirred mixture of 176 g. of 5-benzoyl-3-methyl-4-nitro-1-propylpyrazole, 202 g. of iron powder, 360 ml. of 95% ethanol, and 360 ml. of water is added 7.3 ml. of concentrated hydrochloric acid. After about 10 minutes, when the initial exothermic reaction has subsided, the mixture is stirred and heated under reflux for 2½ hours. Upon cooling, the mixture is filtered and the filtrate is evaporated to dryness under reduced pressure. The residue is diluted with ether, the ethereal mixture is filtered, and the filtrate is washed with 1 N sodium hydroxide and with saturated aqueous sodium chloride, dried, and evaporated to give a residue of 4-amino-5-benzoyl-3-methyl-1-propylpyrazole, which is purified by distillation; B.P. 134–142° C./0.12 mm. Hg.

A mixture consisting of 61 g. of 4-amino-5-benzoyl-3-methyl - 1 - propylprazole, 84 g. of glycine ethyl ester hydrochloride, 5.5 ml. of piperidine, and 250 ml. of pyridine is stirred and heated under reflux for 30 hours and then evaporated to dryness under reduced pressure. The residue is shaken with a mixture of 500 ml. of dichloromethane and 200 ml. of water, and the organic phase is separated, treated with charcoal and anhydrous magnesium sulfate, filtered, and evaporated under reduced pressure to give 4,6-dihydro-3-methyl-8-phenyl-1-propylpyrazolo[4,3 - e][1,4]diazepin - 5(1H) - one; M.P. 162–172° C., following crystallization from 2-propanol.

Example 5

Utilizing the procedure described in Example 1 above, from the hydrogenation of 9.8 g. of 4,6-dihydro-3,4-dimethyl - 1 - propylpyrazolo[4,3 - e][1,4]diazepin-5(1H)-one in the presence of 1.0 g. of 10% platinum-on-charcoal in 100 ml. of methanol, there is obtained 4,6,7,8 - tetrahydro - 3,4 - dimethyl - 8 - phenyl-1-propylpyrazolo[4,3-e][1,4]diazepin-5(1H)-one. This free base product is dissolved in 2-propanol, the solution is treated first with a saturated solution of hydrogen chloride in 2-propanol, and then with excess ether, and the 4,6,7,8-tetrahydro - 3,4 - dimethyl - 8 - phenyl-1-propylpyrazolo [4,3-e][1,4]diazepin-5(1H)-one, monohydrochloride that precipitates is isolated and purified by crystallization twice from 2-propanol-ether; M.P. 222–225° C.

The starting material used above is prepared as follows. To a stirred mixture of 3.1 g. of a 56.6% sodium hydride in mineral oil dispersion and 100 ml. of dimethyl sulfoxide at room temperature is added in portions 20 g. of 4,6-dihydro - 3 - methyl - 8 - phenyl - 1 - propylpyrazolo [4,3-e][1,4]diazepin-5(1H)-one. The resulting mixture is stirred for 30 minutes, 10.3 g. of iodomethane is added and stiring is continued for 16 hours at room temperature. The reaction mixture is then poured into 500 ml. of water, and the aqueous mixture is extracted with dichloromethane. The dichloromethane extract is washed with water, dried, and evaporated under reduced pressure to give 4,6 - dihydro - 3,4 - dimethyl - 8 - phenyl-1-propyl-pyrazolo[4,3-e][1,4]diazepin-5(1H)-one; M.P. 82–84° C., following crystallization from benzene-pentane.

Example 6

A mixture consisting of 6.58 g. of 1-ethyl-4,6,7,8-tetrahydro - 3 - methyl - 8 - phenylpyrazolo[4,3-e][1,4] diazepin-5(1H)-one, 3.5 ml. of 40% aqueous formaldehyde, 11 ml. of 90% formic acid, and 10 ml. of ethanol is heated under reflux for 90 minutes and is then concentrated under reduced pressure to one-half its previous volume, cooled, and poured into ice-water. The aqueous solution is neutralized with potassium carbonate, and the neutral solution is extracted with chloroform. The chloroform extract is evaporated, and the residue is dissolved in dilute hydrochloric acid. The acidic solution is washed with ether, made alkaline with potassium carbonate, and the alkaline mixture is extracted with three 75-ml. portions of dichloromethane. The combined extracts are dried and evaporated under reduced pressure to give a solid residue of 1-ethyl-4,6,7,8-tetrahydro-3,7-dimethyl-8-phenylpyrazolo[4,3 - e][1,4]diazepin - 5(1H)-one; M.P. 176–178.5° C., following two crystallizations from ethanol.

Example 7

Utilizing the procedure described in Example 6 above, the following 7 - methyltetrahydropyrazolodiazepinone compounds are obtained from the reactions indicated below:

(a) From the reaction of 7.7 g. of 4,6,7,8-tetrahydro-1,3 - dimethyl - 8 - phenylpyrazolo[4,3-e][1,4]diazepin-5(1H)-one with 3.6 ml. of 40% aqueous formaldehyde and 7.5 ml. of 90% formic acid in 5.0 ml. of ethanol, there is obtained 4,6,7,8 - tetrahydro - 1,3,7 - trimethyl-8-phenylpyrazolo[4,3 - e][1,4]diazepin - 5(1H)-one; M.P. 179–181° C., following crystallization from ethanol.

(b) From the reaction of 6.3 g. of 4,6,7,8-tetrahydro-1,3,4 - trimethyl - 8 - phenylpyrazolo[4,3-e][1,4]diazepin 5(1H)-one with 2.5 ml. of 40% aqueous formaldehyde and 5.1 ml. of 90% formic acid, there is obtained 4,6,7,8-tetrahydro - 1,3,4,7 - tetramethyl - 8 - phenylpyrazolo [4,3-e][1,4]diazepin-5(1H)-one. This free base product is dissolved in excess 2-propanolic hydrogen chloride, and the solution is treated with sufficient ether to bring about the crystallization of 4,6,7,8-tetrahydro-1,3,4,7-tetramethyl - 8 - phenylpyrazolo[4,3 - e][1,4]diazepin-5(1H)-one, monohydrochloride; M.P. 229–232° C., following crystallization from ethanol-ether.

(c) From a reaction mixture consisting of 12 g. of 4,6,7,8 - tetrahydro - 3 - methyl - 8 - phenyl - 1 - propyl-pyrazolo[4,3-e][1,4]diazepin-5(1H)-one, 5.1 ml. of 40% aqueous formaldehyde, 10.6 ml. of 90% formic acid and 1.0 ml. of ethanol, there is obtained 4,6,7,8-tetrahydro-3,7 - dimethyl - 8 - phenyl - 1 - propylpyrazolo[4,3-e] [1,4]diazepin-5(1H)-one; M.P. 166–168° C., following crystallization from acetonitrile.

(d) From the reaction of 6.3 g. of 4,6,7,8-tetrahydro-3,4 - dimethyl - 8 - phenyl - 1 - propylpyrazolo[4,3-e] [1,4]diazepin-5(1H)-one with 2.3 ml. of 40% aqueous formaldehyde and 4.7 ml. of 90% formic acid, there is obtained 4,6,7,8 - tetrahydro - 3,4,7 - trimethyl - 8-phenyl-1 - propylpyrazolo[4,3 - e][1,4]diazepin - 5(1H)-one; M.P. 97–99.5° C., following crystallization from benzene-pentane.

I claim:

1. A member of the class consisting of tetrahydropyrazolodiazepinone compounds having the formula

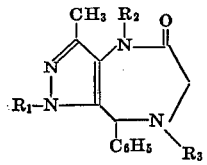

and pharmaceutically-acceptable acid-addition salts thereof; where $R_1$ is an alkyl group having not more than three carbon atoms, and each of $R_2$ and $R_3$ is hydrogen or methyl.

2. A compound according to claim 1 which is 1-ethyl - 4,6,7,8 - tetrahydro - 3 - methyl - 8 - phenylpyrazolo[4,3-e][1,4]diazepin-5(1H)-one.

3. A compound according to claim 1 which is 4,6,7,8-tetrahydro - 1,3 - dimethyl - 8 - phenylpyrazolo[4,3-e][1,4]diazepin-5(1H)-one.

4. A compound according to claim 1 which is 4,6,7,8-tetrahydro - 3 - methyl - 8 - phenyl - 1 - propylpyrazolo[4,3-e][1,4]diazepin-5(1H)-one.

5. A compound according to claim 1 which is 4,6,7,8-tetrahydro - 3,4 - dimethyl - 8 - phenyl - 1 - propylpyrazolo[4,3-e][1,4]diazepin-5(1H)-one.

6. A compound according to claim 1 which is 4,6,7,8-tetrahydro - 3,7 - dimethyl - 8 - phenyl - 1 - propylpyrazolo[4,3-e][1,4]diazepin-5(1H)-one.

References Cited
UNITED STATES PATENTS 3,136,815  6/1964  Reeder et al. ____ 260—239.3 D
3,557,095  1/1971  DeWald _____ 260—239.3 B HENRY R. JILES, Primary Examiner
R. T. BOND, Assistant Examiner U.S. Cl. X.R.
424—273

UNITED STATES PATENT OFFICE
CERTIFICATE OF CORRECTION

Patent No. 3,700,657          Dated October 24, 1972

Inventor(s) Ivan C. Nordin

It is certified that error appears in the above-identified patent and that said Letters Patent are hereby corrected as shown below:

Column 1, lines 13-14, "3-methyl-4,6,7,8-tetrahydropyrazolo[4,3-e][1,4]diazepin-5(1H)-one" should read -- 4,6,7,8-Tetrahydro-3-methyl-8-phenylpyrazolo[4,3-e][1,4]-diazepin-5(1H)-ones -- .

Signed and sealed this 17th day of April 1973.

(SEAL)
Attest:

EDWARD M. FLETCHER, JR.
Attesting Officer

ROBERT GOTTSCHALK
Commissioner of Patents